(No Model.)
J. DARRAGH.
LEVELING DEVICE.
No. 532,949. Patented Jan. 22, 1895.
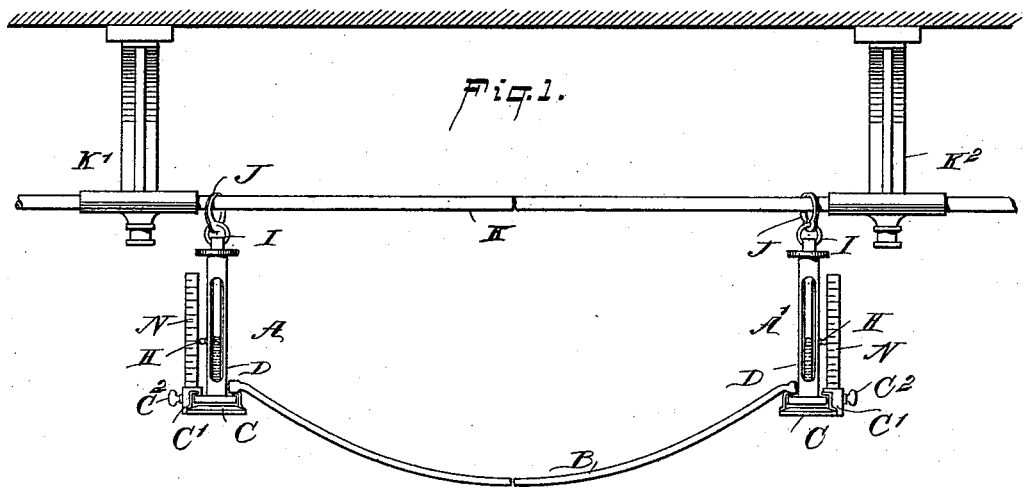
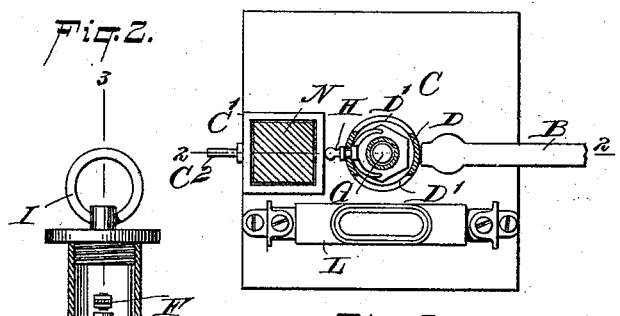
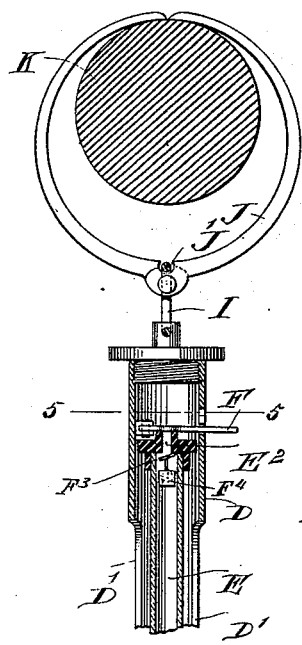
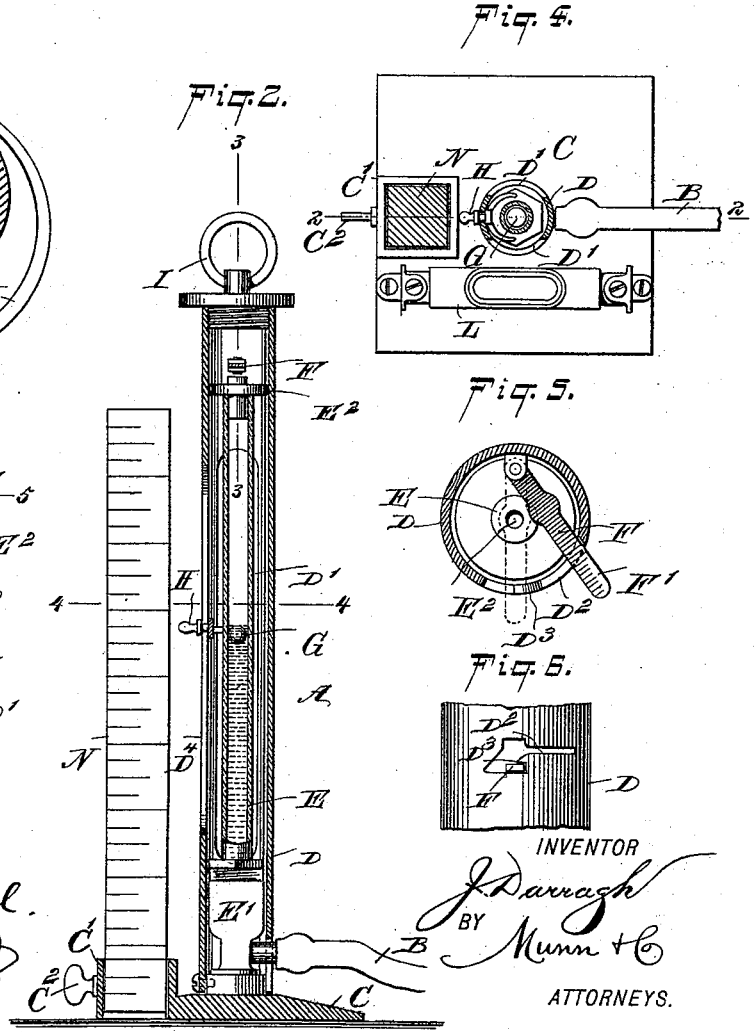
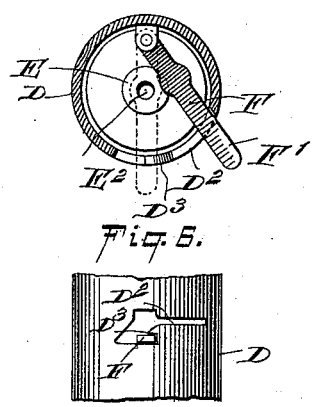
WITNESSES:
William Gaebel
Theo. G. Hoster
INVENTOR
J. Darragh
BY Munn & Co
ATTORNEYS.

UNITED STATES PATENT OFFICE.

JAMES DARRAGH, OF NEW YORK, N. Y.

LEVELING DEVICE.

SPECIFICATION forming part of Letters Patent No. 532,949, dated January 22, 1895.

Application filed April 27, 1894. Serial No. 509,196. (No model.)

*To all whom it may concern:*

Be it known that I, JAMES DARRAGH, of New York city, in the county and State of New York, have invented a new and Improved Leveling Device, of which the following is a full, clear, and exact description.

The object of the invention is to provide a new and improved leveling device, which is simple and durable in construction, and designed for use in machine shops, and by bridge builders, carpenters, masons and other mechanics, the device being arranged in such a manner as to conveniently level in places considerable distances apart, and without the use of straight edges or other tools.

The invention is an improvement in the class of leveling devices composed of two indicators, consisting of graduated glass tubes, and a flexible tube, which connect them, the same containing a liquid whose rise and fall in the glass tubes indicates the difference of elevation.

The construction and combination of parts involving the invention are hereinafter described generally, and specifically indicated.

The invention consists in certain parts and details, and combinations of the same, as will be hereinafter fully described and then pointed out in the claims.

Reference is to be had to the accompanying drawings, forming a part of this specification, in which similar letters of reference indicate corresponding parts in all the views.

Figure 1 is a side elevation of the improvement as applied for leveling shafting. Fig. 2 is an enlarged sectional side elevation of the improvement, on the line 2—2 of Fig. 4. Fig. 3 is a transverse section of the same, on the line 3—3 of Fig. 2. Fig. 4 is a sectional plan view of the same, on the line 4—4 of Fig. 2. Fig. 5 is an enlarged sectional plan view of the valve mechanism for the liquid indicators; and Fig. 6 is a side elevation of the same.

The improved leveling device is provided with two liquid indicators A and A', both alike in construction, and connected with each other by a flexible tube B, of a suitable length to permit of placing the liquid indicators the desired distance apart for leveling, as hereinafter more fully explained. As both liquid indicators A and A' are exactly alike in construction, it suffices to describe but one.

Each liquid indicator is provided with a suitably constructed base C, on which is secured a metallic tube D, formed on opposite sides with openings D', to permit the operator to view the rise and fall of the liquid, as hereinafter more fully described.

In the tube D is arranged a glass tube E, set at its lower end in a base E' fastened to the tube D, and connected with one end of the flexible tube B. The two glass tubes E of the two liquid indicating devices are filled about half of their height with liquid, and the tube B is likewise filled with the liquid, so that on raising one of the indicators, the liquid therein will fall and correspondingly rise in the other indicator, as is well known.

The upper end of each glass tube E is adapted to be closed by a lever valve F, pivoted on the inside of the tube D, and adapted to be seated on a flexible seat $E^2$ secured in the upper end of the tube E. The lever valve F is formed with a handle F', extending through a slot $D^2$ in the tube D, and is adapted to be engaged under a shoulder $D^3$, as plainly shown in Fig. 6, so as to securely hold the lever valve F in place at a time when the valve is seated on the seat $E^2$.

On the under side of the seat $E^2$ and within the glass tube E is arranged a self closing check valve $F^3$ controlled by a float $F^4$ (see Fig. 3), so that if the liquid in the tube E should rise to near the top of the tube E the check valve $F^3$ will close to prevent escape and loss of the liquid.

In each of the tubes E is held loosely a float G, made in the shape of a ball of light material so as to rise and fall with the rise and fall of the liquid in the tube. In a groove $D^4$ formed in the tube D, is held vertically adjustable a pointer H, indicating on the glass tube E, so as to mark the original height of the liquid at the time the two indicators stand on a level.

On the upper end of each tube D is secured a ring I, for conveniently suspending each indicator from an article, such as shafting K, for instance, as illustrated in Fig. 1, the said ring I being engaged with a suspensory device, J, resembling calipers, whose curved jaws embrace the shaft, K, as plainly shown in Figs. 1 and 3, to support its corresponding liquid indicator from the shaft. The calipers J are each provided near their pivot end on both members with registering grooves J', for the passage of the ring I, so that when the calipers are in place on the shafting K, and the ring I engages the said registering notches, then the ring prevents the opening of the calipers to such an extent as to become detached from the shafting K. By this arrangement all danger of accidental detachment of the indicator from the shafting is prevented.

On the base C is arranged a suitable spirit level L, to indicate the proper horizontal position of the base. On one side of the base C is formed a socket C', in which is held vertically adjustable by means of a set screw $C^2$, the graduated rod N, to indicate the distance of the base C from a certain object, as will be hereinafter more fully described.

The operation is as follows: When it is desired to use the device for leveling shafting, for instance, as shown in Fig. 1, then the operator first places the two indicating devices A and A' on a leveling bed, and then adjusts the pointers H to the middle of the indicating balls G, it being understood that the lever valves F of both indicating devices are now open, to permit the atmospheric air to bring the float balls to their proper levels. In using the device now, the operator first closes the valves F, and then takes the one indicating device A, and by a pair of calipers J supports it on the shafting K, near one of the hangers K', and then takes the other indicating device A' and supports it near the second hanger $K^2$, connection being established between the two indicating devices by the tube B. When this is done, the operator opens the valves F so as to permit the atmospheric air to bring the float balls G to their proper levels, and when the operator is at work on the hanger $K^2$, he will see at a glance whether the ball G of the indicating device A' is in the proper position relative to the pointer H, and if not, the operator adjusts the hanger $K^2$ to raise or lower this end of the shafting K until the ball G is in alignment with the pointer H.

This now indicates that the shafting K is perfectly level between the hangers K' and $K^2$.

The device can be used in various ways, and instead of supporting the indicators A A' by the calipers J, they may be set with their bases on different levels, and when it is desired to find out the difference between the two levels, then the operator loosens the set screw $C^2$ of the lowermost indicating device, and then raises the same so that the graduated rod N remains in contact with its lower end on the level place, and the operator moves or raises the indicating device until the float ball stands at a proper level relative to its pointer H. The heights between the two places can now be read off on the graduations of the graduated rod N.

It will be seen that this device can be used in machine shops, and by bridge builders, carpenters, masons and other mechanics, also in grading streets, sidewalks, &c.

Having thus described my invention, I claim as new and desire to secure by Letters Patent—

1. The combination with the suspending devices, composed of inwardly-curved jaws pivoted together and having internal, registering grooves located at points opposite the pivots of said jaws, the indicators composed of liquid-holding glass tubes and a flexible connecting tube, and slotted metallic tubes inclosing the former, and rings attached to the indicators and adapted to fit in the aforesaid grooves of the jaws, as shown and described.

2. In a leveling device of the character indicated, the combination, with the flexible tube, the glass tubes open at their upper ends, and the inclosing metallic tubes having a side slot provided with an undercut portion forming a shoulder, of a valve, pivoted to the metallic tube and having a handle which projects through the slot and is adapted to lock under said shoulder, as shown and described, for the purpose specified.

JAMES DARRAGH.

Witnesses:
HENRY P. JOYCE,
LUDWIG VOGEL.